(12) United States Patent
Beguin et al.

(10) Patent No.: US 7,936,556 B2
(45) Date of Patent: May 3, 2011

(54) ELECTROCHEMICAL CAPACITOR WITH TWO CARBON ELECTRODES HAVING DIFFERENT CHARACTERISTICS IN AN AQUEOUS MEDIUM

(75) Inventors: François Beguin, Olivet (FR); Volodymyr Khomenko, Kiev (UA); Encarnacion Raymundo-Pinero, Orleans (FR)

(73) Assignees: Centre National de la Recherche Scientifique (C.N.R.S.), Paris (FR); Universite d'Orleans, Orleans (FR)

( * ) Notice: Subject to any disclaimer, the term of this patent is extended or adjusted under 35 U.S.C. 154(b) by 0 days.

(21) Appl. No.: 12/516,874

(22) PCT Filed: Nov. 30, 2007

(86) PCT No.: PCT/FR2007/001969
§ 371 (c)(1),
(2), (4) Date: Jan. 27, 2010

(87) PCT Pub. No.: WO2008/071888
PCT Pub. Date: Jun. 19, 2008

(65) Prior Publication Data
US 2010/0141044 A1 Jun. 10, 2010

(30) Foreign Application Priority Data
Nov. 30, 2006 (FR) ...................... 06 10483

(51) Int. Cl.
*H01G 9/00* (2006.01)
*H01G 9/04* (2006.01)
*H01G 9/042* (2006.01)
*H01G 9/048* (2006.01)

(52) U.S. Cl. .......... 361/502; 361/503; 29/25.03
(58) Field of Classification Search .......... 361/502, 361/503; 29/25.03
See application file for complete search history.

(56) References Cited

U.S. PATENT DOCUMENTS

| | | | |
|---|---|---|---|
| 2,800,616 | A | 7/1957 | Becker |
| 3,288,641 | A | 11/1966 | Rightmire |
| 4,251,568 | A | 2/1981 | Hart |
| 4,313,084 | A | 1/1982 | Hosokawa et al. |
| 4,562,511 | A | 12/1985 | Nishino et al. |

FOREIGN PATENT DOCUMENTS
EP 1 085 541 3/2001

OTHER PUBLICATIONS

International Search Report dated Jun. 17, 2008, from corresponding PCT application.
Encarnacion Raymundo-Pinero et al, "A High-Performance Carbon for Supercapacitors Obtained by Carbonization of a Seaweed Biopolymer", Advanced Materials, 2006, vol. 18, No. 14, ISSN: 0935-9648, p. 1877-1882 (abstract provided only).

*Primary Examiner* — Evan Pert
(74) *Attorney, Agent, or Firm* — Young & Thompson

(57) ABSTRACT

An electrolytic capacitor (1) includes a first electrode (2) and a second electrode (3) each including carbon and an aqueous electrolyte (4) situated at the interface of the two electrodes. The carbon surface of the first electrode (2) has an atomic degree of functionalization which is at least twice that of the carbon surface of the second electrode (3).

19 Claims, 3 Drawing Sheets

ELECTROCHEMICAL CAPACITOR WITH TWO CARBON ELECTRODES HAVING DIFFERENT CHARACTERISTICS IN AN AQUEOUS MEDIUM

The present invention relates to an electrolytic capacitor comprising two carbon electrodes and an aqueous electrolyte situated at the interface of the two electrodes, and to a process for producing said capacitor.

An electrolytic capacitor in this case is a device for storing the electrical energy resulting from the separation of charged species and/or from redox reactions.

The use of double-layer electrolytic capacitors where the charged species are separated at the electrode/electrolyte interface is known. In this case the electrical energy is stored in electrostatic form by charge separation.

U.S. Pat. No. 2,800,616 accordingly describes a capacitor comprising two identical porous carbon electrodes and an inorganic aqueous electrolyte such as an ammonium chloride solution ($NH_4Cl$) or a sulphuric acid solution ($H_2SO_4$).

The use of double-layer capacitors comprising activated carbon electrodes is also known. U.S. Pat. No. 3,288,641 accordingly describes a double-layer capacitor comprising two activated carbon electrodes treated with metals or metal halides. U.S. Pat. No. 4,313,084 discloses two electrodes comprising the same paste formed by activated carbon mixed with sulphuric acid. Finally, U.S. Pat. No. 4,562,511 describes a capacitor of which one electrode is made of activated carbon while the other electrode consists of a conducting metal.

The electrolyte used in this type of capacitor is aqueous or organic. The aqueous electrolyte leads to a fairly low energy density as the maximum operating voltage is about 0.6 to 0.7 V.

In fact, the energy density (E) is proportional to the capacitance (C) and to the square of the operating voltage (U) as shown in the following general formula:

$$E = \frac{1}{2} * C * U^2$$

The maximum operating voltage with an organic electrolyte is generally about 2.3 to 2.5 V. Organic electrolytes are therefore usually preferred to obtain improved energy density.

The power (P) output by the capacitor is proportional to the square of the voltage (U) but inversely proportional to the series resistance ($R_S$), as shown by the following formula:

$$P = \frac{U^2}{4 * R_S}$$

The series resistance ($R_S$) corresponds to the sum of all the resistances imposed by the elements forming the capacitor, particularly the electrolyte. However, aqueous electrolytes have a higher conductivity than organic electrolytes. As an example, the conductivity of a 1M solution of $H_2SO_4$ is about 0.02 S cm$^{-1}$, and that of an organic solution is about 1 S cm$^{-1}$. The contribution of the series resistance therefore generally involves a higher power output in the presence of an aqueous electrolyte than in the presence of an organic electrolyte.

Consequently, electrolytic capacitors do not have both a high power output and a high energy density.

An object of the present invention is to provide an electrolytic capacitor with high capacitance and high operating voltage in an aqueous medium, thus producing a higher energy density and a higher power output.

According to a first aspect, the invention accordingly relates to an electrolytic capacitor comprising a first and second electrode each comprising carbon and an aqueous electrolyte situated at the interface of the two electrodes, characterised in that the carbon surface of the first electrode has an atomic degree of functionalisation at least twice that of the carbon surface of the second electrode.

A carbon surface is said to be "functionalised" when said surface has heteroatoms bound to one or more carbon atoms. The heteroatoms in this case are atoms belonging to the chalcogen or pnictogen family, in particular O, N, S or P. According to a preferred embodiment, the carbon surface is functionalised by oxygenated, nitrogenous, sulphurous and/or phosphorous functions.

The atomic degree of functionalisation is determined here by the sum of the atomic ratios of the heteroatoms bound to one or more carbon atoms and present at the carbon surface.

According to a preferred embodiment, the carbon surface of the first electrode comprises at least twice as many oxygenated functions as the carbon surface of the second electrode. An oxygenated function in this case corresponds to an oxygen atom bound in a single bond to one or two carbon atoms, forming for example phenolic or ethereal functions, in a double bond to a carbon atom forming for example quinonic functions, or in both single and double bonds forming for example carboxylic or lactonic functions.

Preferably, the carbon mass of the two electrodes is substantially identical.

In operation, the capacitor is connected either to an electric power source in order to charge the capacitor, or to a system to which the stored charge is to be delivered in order to discharge the capacitor.

During charging the first electrode, having a higher atomic degree of functionalisation, is connected to the positive terminal of the electric power source and is therefore called the "positive electrode". The second electrode is connected to the negative terminal and is called the "negative electrode". During discharging, the capacitor is connected to the supplied system to which it delivers an electric current.

First, the capacitor according to the invention has a capacitance greater than symmetrical capacitors comprising two identical carbon electrodes.

In fact, two different phenomena occur in the region of each electrode during charging and/or discharging of the capacitor allowing the capacitance of the capacitor according to the invention to be increased. The capacitance of the capacitor is therefore between 180 and 320 F g$^{-1}$ (gram of carbonated electrode material).

During charging, the ions present in the electrolyte are fixed electrostatically to the surface of each electrode as in the case of double-layer symmetrical capacitors. However, another phenomenon occurs in addition to said electrostatic phenomenon. In fact, the two electrodes are equally involved in different types of pseudo-faradic reaction. This contribution is known as pseudo-capacitance. The pseudo-faradic reactions occur in different potential ranges. As an example, during charging at pH=0, the redox reactions occur at the second electrode at about −0.9 V vs $Hg/Hg_2SO_4$ whereas at the first electrode, they occur at about −0.1 V vs $Hg/Hg_2SO_4$. As an example, the redox reactions that take place at the positive pole of the capacitor may cause the intervention of the quinone/hydroquinone pairs for the oxygenated functions and the function pairs C=NH/CH—$NH_2$ and C—NHOH/

C—$NH_2$ for the nitrogenous functions, whereas at the negative pole, the oxygenation-reduction reactions cause the decomposition of the water and the sorption of the nascent hydrogen in the carbon.

During discharging, the redox reactions that occur are opposite to those that take place during charging.

Secondly, the operating voltage of the electrolytic capacitor according to the invention is greater than that of a symmetrical capacitor. In fact, the higher atomic degree of functionalisation of the carbon surface of the first electrode enables higher positive potentials to be achieved, in particular higher than about 0.6 V vs $Hg/Hg_2SO_4$, during charging. The potential of the second electrode reaches −1.2 V vs $Hg/Hg_2SO_4$, for example, without release of dihydrogen, during charging.

The capacitor according to the invention comprising an aqueous electrolyte therefore has a maximum operating voltage of about 1.8 V.

The capacitor according to the invention therefore has a maximum energy density of about 30 Wh $kg^{-1}$ (kilogram of carbonated material from the two electrodes) and a maximum power output of about 37.5 kW $kg^{-1}$ (kilogram of carbonated material from the two electrodes). With the capacitors known from the art it is not possible to achieve such values for the energy density-output power pair.

According to an embodiment, the aqueous electrolyte is chosen from among those widely used in the art. In particular, the aqueous electrolyte is an alkaline or acidic aqueous solution, preferably an aqueous solution comprising sulphuric acid.

The sulphuric acid content of the aqueous solution is preferably between 0.5 and 6 mol $l^{-1}$, in particular about 1 mol $l^{-1}$.

The presence of aqueous electrolyte in the capacitor according to the invention leads to higher power output and lower resistance than if the electrolyte is organic. Moreover, as the operating voltage of the capacitor according to the invention is high, the power and energy delivered by the capacitor according to the invention are higher than those of conventional capacitors comprising an aqueous electrolyte.

Using an aqueous solution has several other advantages. Thus, it is more economical to use an aqueous solution than a solution comprising an organic solvent. Moreover, fewer restrictions are imposed with the use of an aqueous solution when using the capacitor according to the invention. In particular, capacitors using organic electrolytes must be produced in an atmosphere which is free from water vapour. In addition, organic electrolytes have the drawback of decomposing with the emission of harmful explosive gases, such as methane, ethane, dioxygen, dihydrogen, carbon monoxide and carbon dioxide, during charging and/or discharging of the capacitor, which is not the case with aqueous electrolytes.

Both electrodes comprise carbon. According to a preferred embodiment, the first electrode and/or the second electrode comprise activated carbon.

The carbon which is untreated, in other words has not undergone any oxidising or reducing treatment, is chosen for example from among the SUPER 50® activated carbons produced by Norit and Maxsorb® produced by Kansai.

Carbon, whether activated or not, is a relatively inexpensive material and has the advantage of reducing electrode production costs.

Untreated carbons, whether activated or not, generally have an oxygen atom content of at most 15%. Untreated carbons, whether activated or not, generally contain less than 2% of nitrogen, sulphur and/or phosphorus atoms. In the case of Norit untreated activated carbon, the carbon comprises about 4.6% of oxygen atoms.

Preferably, the Norit-type untreated activated carbon is the raw material of the first electrode.

If the surface of the untreated carbon, whether activated or not, is not sufficiently functionalised, it is not possible to increase both the capacitance and the operating voltage window of the capacitor. The untreated carbon therefore undergoes a treatment known as "highly oxidising" thus increasing functionalisation, particularly the number of functions such as the oxygenated, nitrogenous, sulphurous and/or phosphorous functions in the material.

Thus, according to an embodiment, the carbon used for the first electrode, whether activated or not, is treated with an oxidising acid solution, in particular a 30% nitric acid solution. Following this treatment, the atomic degree of functionalisation of the carbon surface is at least three times greater than the surface of untreated carbon.

According to another embodiment, a carbon which is intrinsically rich in heteroatoms, for example in oxygen or nitrogen, is used as the untreated material of the first electrode. An example of untreated carbon obtained by carbonisation of seaweed biopolymers is that described in the publication Raymundo-Piñero E., Leroux F., Béguin F., A High-Performance Carbon for Supercapacitor Obtained by Carbonization of a Seaweed Biopolymer, Adv. Mat. 2006, 18, 1877-1882.

During charging, the oxygenated functions of the carbon surface of the first electrode influence the redox processes. Functionalised activated carbon may be used in the first electrode inasmuch as the destruction potential of the porous structure thereof by electrochemical oxidation increases by about 0.3 to 0.4 V.

According to an embodiment, during charging, the hydrogen from the reduction of water on the second electrode is adsorbed in large amounts in the micropores of the carbon. In particular, during charging, because of the large over voltage of the second carbon electrode, whether activated or not, the potential of this electrode is displaced to values lower than −0.62 V vs $Hg/Hg_2SO_4$ at pH=0 without release of dihydrogen.

According to an embodiment, the specific volume of micropores having a diameter of at most 0.7 nm of the carbon, whether activated or not, of one of the electrodes is greater than the other electrode, in particular the specific volume of the micropores of at most 0.7 nm of the carbon, whether activated or not, of the second electrode is greater than that of the carbon, whether activated or not, of the first electrode.

As an example, the specific volume of micropores having a diameter of at most 0.7 nm is between 0.1 and 1.2 $cm^3$ $g^{-1}$, preferably between 0.6 $cm^3$ $g^{-1}$ and 0.8 $cm^3$ $g^{-1}$, or even better between 0.61 and 0.67 $cm^3$ $g^{-1}$ for the carbon, whether activated or not, of the second electrode. The specific volume of micropores having a diameter of at most 0.7 nm is between 0.1 and 1.2 $cm^3$ $g^{-1}$, preferably between 0.2 $cm^3$ $g^{-1}$ and 0.55 $cm^3$ $g^{-1}$, or better still between 0.49 and 0.50 $cm^3$ $g^{-1}$ for the carbon, whether activated or not, of the first electrode. The volume of micropores having a diameter of at most 0.7 nm is obtained by the Dubinin-Radushkevitch $CO_2$ adsorption isotherm procedure.

The BET specific surface area of the carbon of the second electrode, determined from the dinitrogen adsorption isotherms at 77 K, is preferably between 50 $m^2$ $g^{-1}$ and 3600 $m^2$ $g^{-1}$, in particular between 3450 $m^2$ $g^{-1}$ and 3570 $m^2$ $g^{-1}$, for example about 3490 $m^2$ $g^{-1}$. The specific surface area of the carbon of the first electrode is preferably between 50 m² g⁻¹ and 3600 m² g⁻¹, for example about 824 m² g⁻¹.

According to a preferred embodiment, the untreated carbon, whether activated or not, of the second electrode undergoes a mild oxidising or reducing treatment. This treatment allows the capacitance of the second electrode to be increased. As an example, in a first embodiment, the untreated carbon, whether activated or not, is mildly oxidised by about 20% hydrogen peroxide solution or, in a second embodiment, mildly reduced by heat treatment at about 700° C. under dihydrogen. After the mild oxidising treatment, the ratio between the atomic oxygen content of the carbon, whether activated or not, of the second electrode and the untreated carbon, whether activated or not, is at most 1.5, or indeed at most 1.32. After the reducing treatment, the ratio between the atomic oxygen content of the carbon, whether activated or not, of the second electrode and the untreated carbon, whether activated or not, is at most 0.06.

According to a preferred embodiment, the electrolytic capacitor also comprises a separator arranged in the electrolyte between the first and second electrodes. Preferably, the separator is a membrane, such as a glass microfibre paper about 0.18 mm thick marketed by Fischer Bioblock, France.

According to a second aspect, the invention relates to a process for producing an electrolytic capacitor according to the invention comprising a stage where the carbon of the first electrode is oxidised by an acidic solution, in particular an aqueous nitric acid solution.

According to an embodiment, the carbon is an activated carbon.

According to an embodiment, the carbon, whether activated or not, is subjected to a highly oxidising treatment, in particular by a 30% nitric acid solution. Following this treatment, the atomic degree of functionalisation is at least three times greater. In particular, the atomic degree of oxygen functionalisation is at least three times greater.

According to a preferred embodiment, the process also comprises a stage where the carbon, whether activated or not, of the second electrode undergoes a different oxidising treatment from that applied to the carbon, whether activated or not, of the first electrode. After a mild oxidising treatment, the ratio between the atomic degrees of functionalisation of the carbon surface, whether activated or not, of the second electrode and the untreated carbon, whether activated or not, is at most 1.5, or indeed at most 1.32.

In a variant, according to another preferred embodiment, the process comprises a stage where the carbon, whether activated or not, of the second electrode undergoes a reducing treatment, after which the ratio of the atomic degrees of functionalisation of the carbon surface, whether activated or not, of the second electrode to the untreated carbon, whether activated or not, is at most 0.06.

According to a third aspect, the invention relates to the use of one or more electrolytic capacitors according to the invention or obtained by the process according to the invention as an electrical energy source in a portable electronic system in a motor vehicle, tramway, train, aircraft and/or in a stationary system such as generating sets.

According to an embodiment, the capacitors according to the invention are arranged in series.

According to a fourth aspect, the invention relates to a portable electronic system, a motor vehicle, rail transport system such as a tramway or train, aircraft and stationary system such as generating sets each independently comprising one or more capacitors according to the invention or obtained by the process according to the invention.

Advantageously, the electrolytic capacitor(s) according to the invention may be connected to at least one battery or fuel cell or heat engine, owing to the great power and high energy density thereof.

The capacitor according to the invention has the advantage of having rapid charge/discharge cycles. As an example, for a mass current of 1 A g⁻¹, with a 1 mol l⁻¹ sulphuric acid solution, a charge/discharge cycle lasts about 280 s. Moreover, the capacitor according to the present invention has a long service life. For example, after 10,000 cycles, the loss of capacitance stabilises at 15%.

According to a fifth aspect, the invention relates to an electrical circuit comprising, preferably during charging, at least one capacitor according to the invention or obtained by the process according to the invention and an electric power source connected to the terminals of the capacitor in such a way that the first electrode is connected to the positive terminal of the source and the second electrode is connected to the negative terminal. During discharging, the capacitor is connected to a system to be supplied with electrical energy.

The invention will be better illustrated on reading the non-limiting examples that follow.

Figure 1:
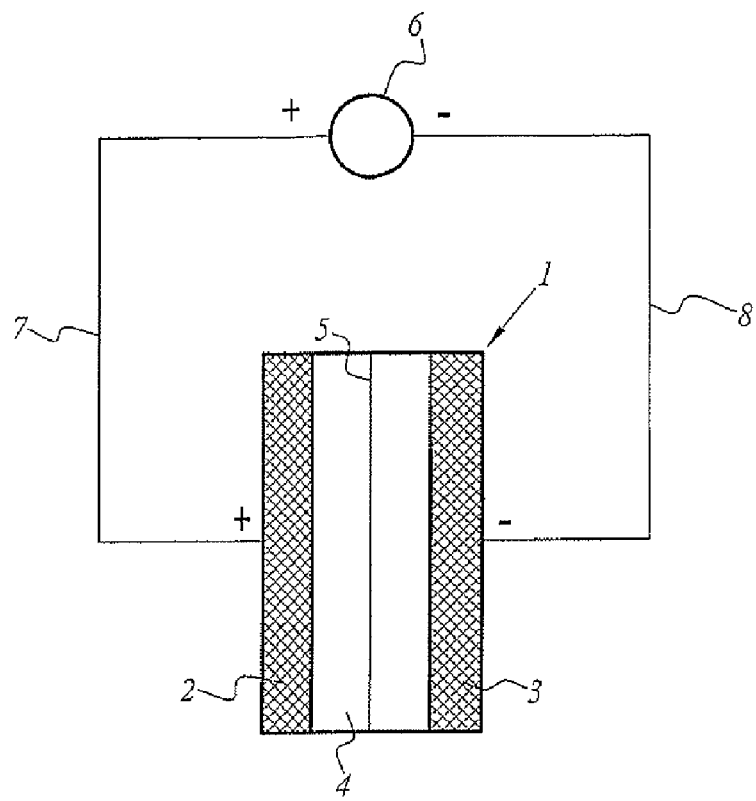
FIG. 1 is a diagram of a capacitor according to the invention during charging.

FIG. 1 shows a capacitor according to the invention during charging. Said capacitor 1 is hereinafter called AB. It comprises:

a first electrode 2 of activated carbon A that has undergone a highly oxidising treatment described below and a second electrode 3 of activated carbon B that has undergone a mild oxidising treatment described below.

Said two electrodes 2 and 3 are arranged so as to face each other and are separated by a space filled with an electrolyte 4 made up of a 1 mol l⁻¹ aqueous sulphuric acid solution.

A porous separator 5 of 0.18 mm thick glass microfibre paper, marketed by Fischer Bioblock, is arranged in the electrolyte 4 between the two electrodes 2 and 3 and separates the space containing the electrolyte 4 into two compartments.

Figure 2:
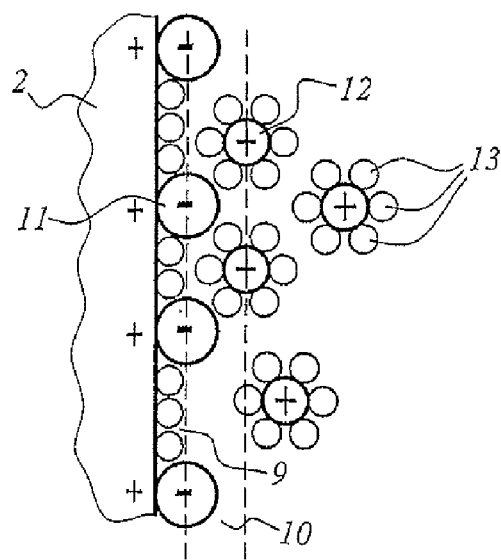
FIG. 2 is a diagram illustrating the double electrochemical layer.

During charging, the first electrode 2 is connected to the positive pole of an electric power source 6 by means of a conducting wire 7. The second electrode 3 is connected to the negative pole of the source 6 by means of another conducting wire 8. The charges are stored by two processes. The first process, shown in FIG. 2, corresponds to the electrostatic charge separation phenomenon. FIG. 2 shows specifically the first electrode 2 connected to the positive terminal of the source 6. During passage of the current, a layer 9 comprising the anions 11 is formed in the electrolyte 4 at the interface with the positively polarised surface of the electrode 2. A second layer 10 is formed on said first layer 9 in the electrolyte 4. The second layer 10 comprises cations 12 which are solvated by the solvent 13 of the electrolyte. Said cations 12 therefore migrate to the negatively polarised negative electrode 3. In parallel to this charge storage phenomenon, redox reactions also take place at the interface of each electrode 2 and 3 causing general intervention of the quinone/hydroquinone groups in the case of the oxygenated functions and the function pairs C=NH/CH—NH$_2$ and C—NHOH/C—NH$_2$ for the nitrogenous functions.

The untreated activated carbon A is for example activated carbon SUPER 50® produced by Norit.

A highly oxidising treatment is applied to the surface of said carbon intended to come into contact with the electrolyte 4. It consists of mixing 1 g of activated carbon with 20 ml of 30% HNO$_3$ for 1 hour at 80° C. The oxidised activated carbon A is thus obtained. Next, the oxidised activated carbon A is washed with distilled water then dried at 120° C. for 12 hours. About 1 g of oxidised activated carbon A is thus obtained.

The untreated activated carbon B is for example the Maxsorb® activated carbon from Kansai.

A mild oxidising treatment is applied to the surface thereof intended to come into contact with the electrolyte 4. It consists of mixing 1 g of activated carbon with 40 ml of 20% H$_2$O$_2$ at ambient temperature for one hour. Next, the carbon obtained is washed with distilled water then dried at 120° C. for 12 hours. About 1 g of mildly oxidised activated carbon B is thus obtained.

In a variant, instead of the oxidising treatment, carbon B undergoes a mild reducing treatment consisting of heating the untreated activated carbon B at 700° C. in a furnace for 1 hour under a dihydrogen atmosphere. About 1 g of reduced activated carbon B is thus obtained.

The elemental composition of the activated carbons A and B, whether treated or not, shown in Table 1 below, was obtained by XPS (X-ray photoelectron spectroscopy). The spectrometer used was the VG Escalab 250 model with a monochromatic source (15 KV, 15 mA) A1Kα and a multidetection analyser, under a residual pressure of $10^{-8}$ Pa.

Thus the activated carbon A in oxidised form has about three times the atomic oxygen content of the untreated activated carbon A and also comprises 1.3% of nitrogen atoms, which are not present in the untreated activated carbon A.

According to Table 1, the atomic oxygen content of the activated carbon B that has undergone a mild oxidising treatment is about 1.3 times greater and that of the one that has undergone a mild reducing treatment is about 16 times less than the untreated activated carbon B.

Moreover, the oxidising and reducing treatments performed on the carbon B do not produce nitrogen atoms that can be detected by chemical analysis.

TABLE 1

| Sample | C (at %) | O (at %) | N (at %) |
|---|---|---|---|
| A | 95.4 | 4.6 | — |
| A oxidised by HNO$_3$ | 83.9 | 14.8 | 1.3 |
| B | 95.0 | 5.0 | — |
| B oxidised by H$_2$O$_2$ | 93.4 | 6.6 | — |
| B reduced by H$_2$ | 99.7 | 0.3 | — |

Table 2 below gives the microporous specific volume of the activated carbons A and B, whether treated or not, determined from the carbon dioxide adsorption isotherms at 273K (Autosorb, Quantachrome®).

The oxidised activated carbon A therefore has a microporous specific volume of about 0.5 cm$^3$ g$^{-1}$.

The mildly oxidised or reduced activated carbon B has a microporous specific volume of between 0.61 and 0.67 cm$^3$ g$^{-1}$.

The mildly oxidised or reduced activated carbon B comprises more micropores per gram of carbon than the oxidised activated carbon A.

TABLE 2

| Sample | $V_{micro}^a$ d < 0.7 nm (cm$^3$/g) |
|---|---|
| A | 0.49 |
| A oxidised by HNO$_3$ | 0.50 |
| B | 0.67 |
| B oxidised by H$_2$O$_2$ | 0.61 |
| B reduced by H$_2$ | 0.66 |

Figure 3:
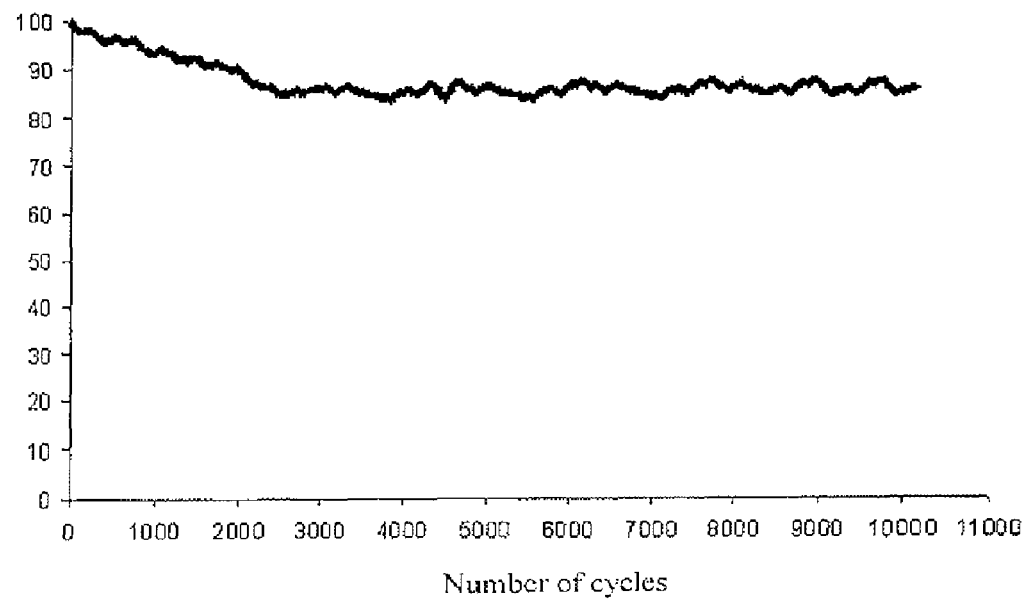
FIG. 3 is a graph showing the discharge capacitance of a capacitor AB according to the invention as a function of the number of charge/discharge cycles.

FIG. 3 shows the change in capacitance of the capacitor AB under a maximum operating voltage of 1.6 V with a current density of 1 A g$^{-1}$ over about 10,000 cycles. Advantageously, this voltage prevents the formation of gases, such as dihydrogen or dioxygen, within the capacitor, which would limit the operation thereof.

The 15% reduction in capacitance during the first 2000 cycles corresponds to the temporary phase, known as the capacitor conditioning phase.

During the further 8000 cycles corresponding to the stationary phase, capacitance remains substantially constant, thus indicating great stability during the charge/discharge cycles and a long service life of the capacitor AB.

The energy density is about 10 times greater than that of a symmetrical capacitor comprising an aqueous electrolyte.

Study of the Activated Carbons Used for the First Electrode Connected to the Positive Pole of an Electric Power Source (Positive Electrode)

A closer study is made of the electrochemical behaviour of the two activated carbons A and B in a symmetrical capacitor using 1 mol l$^{-1}$ sulphuric acid as the electrolyte. The capacitance is approximately 101 F/g in the case of A and 230 F/g in the case of B.

The activated carbons A and B were oxidised with 30% nitric acid to increase their capacitance.

Figure 4:
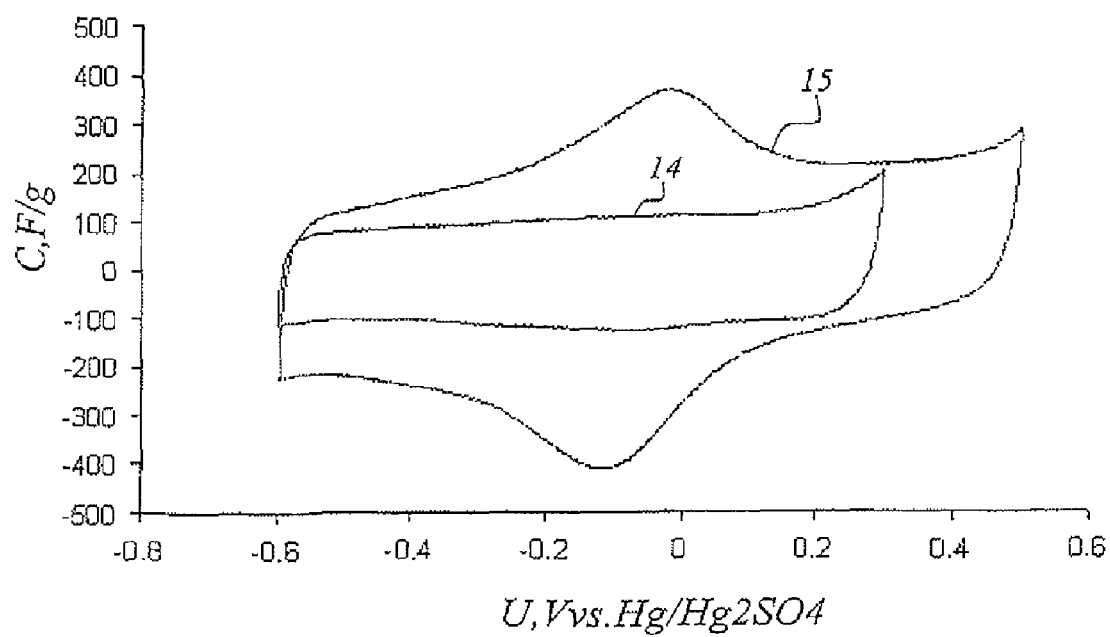
FIG. 4 is a graph showing two cyclic voltammograms of activated carbon A and oxidised activated carbon A obtained in a three-electrode cell.

The cyclic voltammograms in FIG. 4 were obtained using a three-electrode cell in a 1 mol l$^{-1}$ sulphuric acid solution. The cyclic voltammograms correspond to the cyclic voltammogram of the untreated activated carbon A 14 and to that of the highly oxidised activated carbon A 15.

FIG. 4 shows that the capacitance of the activated carbon A increases from 110 F/g to 214 F/g when the activated carbon A has undergone the highly oxidising treatment.

On the other hand, the capacitance of the activated carbon B decreases from 230 to 180 F/g when the activated carbon B has undergone the highly oxidising treatment. In fact, the porous texture of the activated carbon B is destroyed during the highly oxidising treatment.

The potential range of the electrode for the oxidised sample A is displaced to more positive potentials. In fact the maximum potential for use of the electrode increases from about 0.3 to 0.6 V vs Hg/Hg$_2$SO$_4$ when the activated carbon A is oxidised. The oxygenated functions of oxidised A are involved in the redox processes taking place at potentials comprised in the operating range of the positive electrode of the capacitor. These redox processes help improve the capacitance of the material.

Study of Activated Carbons Used for the Second Electrode Connected to the Negative Pole of a Source (Negative Electrode)

Figure 5:
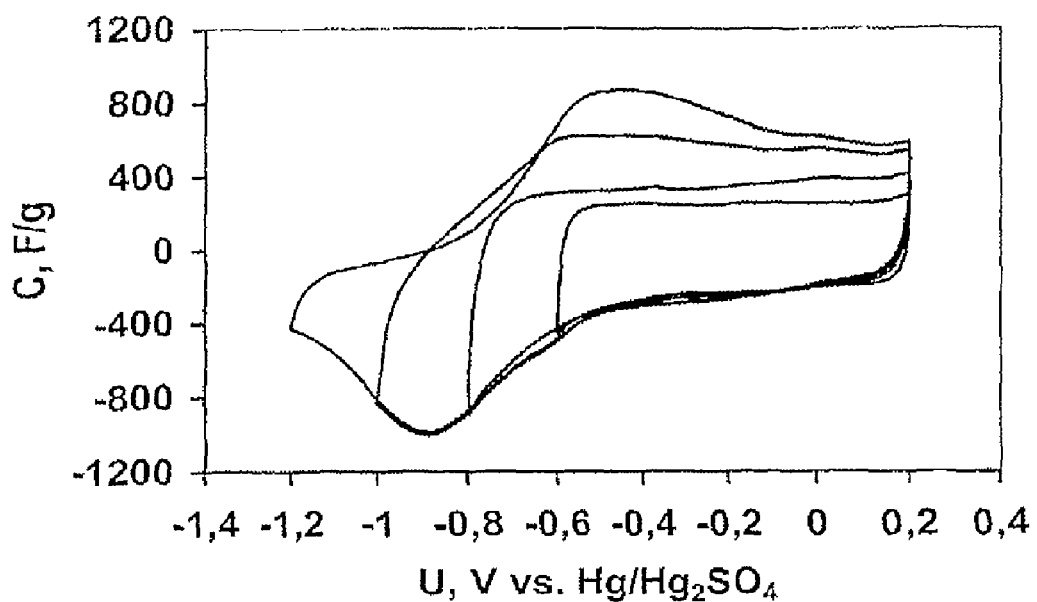
FIG. 5 is a graph showing two cyclic voltammograms of activated carbon B obtained in a three-electrode cell.

The voltammograms shown in FIG. 5 were produced in the same conditions as those in FIG. 4.

Referring to FIG. 5, two effects occur at this electrode when it is polarised at negative potential values. The first effect appears as a large excess voltage along with the appearance of dihydrogen, which allows the window of potential to be significantly increased when an activated carbon is used as the negative electrode. In the case of the activated carbon B, the excess voltage causing the formation of dihydrogen is greater than the activated carbon A and is about 0.6 V. The second effect is expressed as an increase in capacitance, because the hydrogen produced by the water reduction is immediately adsorbed in the pores of the carbon B and is reversibly electro-oxidised during anodic oxidation. In this case, the pseudo-capacitive properties of the activated carbon B are associated with the redox mechanisms of the hydrogen in the pores. The activated carbon B which is untreated or pre-treated by a mild oxidising or reducing treatment, has a capacitance of about 600 F $g^{-1}$.

The Non-Symmetrical System

In view of the above results, it is useful to construct an asymmetrical system using two different activated carbons but comprising a substantially identical carbon mass. The negative electrode comprises the activated carbon B which is untreated or pre-treated by a mild oxidising or reducing treatment, and has a capacitance of about 600 F $g^{-1}$. The positive electrode comprises the highly oxidised activated carbon A, which has a capacitance of about 300 F $g^{-1}$.

Figure 6:
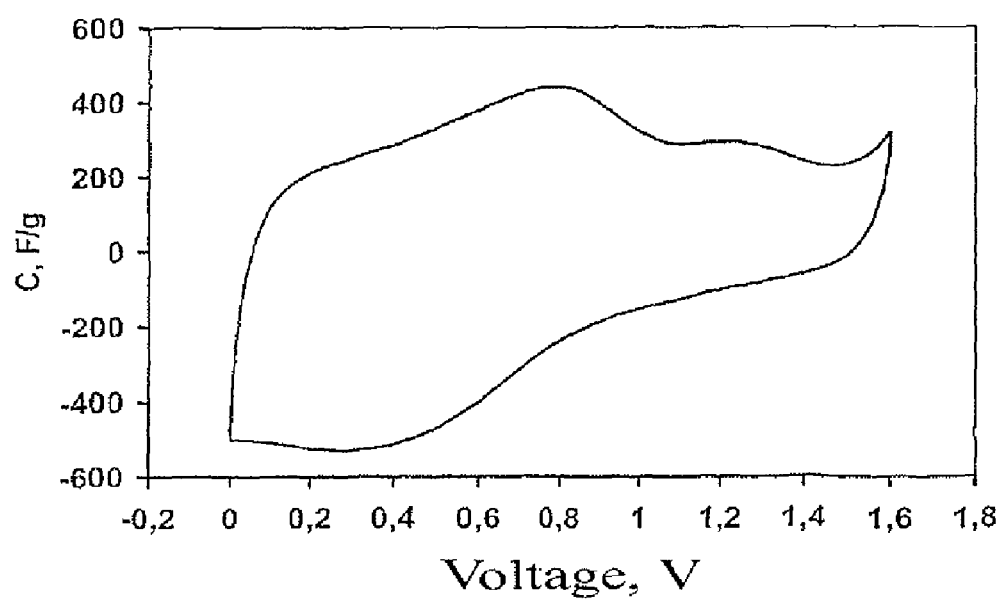
FIG. 6 is a graph showing a voltammogram of a capacitor according to the invention.

FIG. 6 shows an example using such electrodes in a capacitor AB according to the invention. The voltammogram is produced in a non-symmetrical, two-electrode cell comprising the same carbon mass using a 1 mol $l^{-1}$ solution of $H_2SO_4$ as the electrolyte.

According to FIG. 6, the combination of these electrodes based on the presence of the more or less oxidised activated carbons A and B allows a maximum voltage for the cell of about 1.6 volts to be obtained without the electrolyte decomposing or the activated carbon of the positive electrode being irreversibly oxidised.

In these conditions, the potential range covered by the negative electrode is between −0.25 and −0.97 V vs $Hg/Hg_2SO_4$ and that covered by the positive electrode is between −0.25 and 0.63 V vs $Hg/Hg_2SO_4$. The total capacitance of the capacitor is increased because the redox reactions occurring at each electrode are different and occur in different and optimal voltage ranges.

The invention claimed is:

1. Electrolytic capacitor (1) comprising a first electrode (2) and a second electrode (3) each comprising carbon and an aqueous electrolyte (4) situated at the interface of the two electrodes, characterized in that the carbon surface of the first electrode (2) has an atomic degree of functionalization which is at least twice that of the carbon surface of the second electrode (3).

2. The electrolytic capacitor according to claim 1, characterized in that the carbon surface is functionalized by oxygenated, nitrogenous, sulphurous and/or phosphorous functions.

3. The electrolytic capacitor according to claim 1, characterized in that the first electrode (2) and/or the second electrode (3) comprise activated carbon.

4. The electrolytic capacitor according to claim 1, characterized in that the specific volume of the micropores having a diameter of at most 0.7 nm of the carbon of the second electrode (3) is greater than that of the carbon of the first electrode (2).

5. The electrolytic capacitor according to claim 1, characterized in that the specific volume of the micropores having a diameter of at most 0.7 nm is between 0.1 $cm^3$ $g^{-1}$ and 1.2 $cm^3$ $g^{-1}$ in the case of the carbon of the second electrode (3).

6. The electrolytic capacitor according to claim 1, characterized in that the specific volume of the micropores having a diameter of at most 0.7 nm is between 0.1 $cm^3$ $g^{-1}$ and 1.2 $cm^3$ $g^{-1}$g in the case of the carbon of the first electrode (2).

7. The electrolytic capacitor according to claim 1, characterized in that it further comprises a separator (5) arranged in the electrolyte (4) between the first (2) and second (3) electrodes.

8. The electrolytic capacitor according to claim 1, characterized in that the aqueous electrolyte is an aqueous solution comprising sulphuric acid.

9. A process for producing an electrolytic capacitor according to claim 1, characterized in that it comprises a stage where the carbon of the first electrode (2) is oxidized by an acidic solution.

10. The process according to claim 9, characterized in that the carbon is activated.

11. The process according to claim 9, characterized in that the acidic solution is an aqueous solution of nitric acid.

12. The process according to claim 9, characterized in that it also comprises a stage where the carbon of the second electrode (3) undergoes an oxidizing treatment different from the treatment applied to the carbon of the first electrode (2).

13. The process according to claim 9, characterized in that it comprises a stage where the carbon of the second electrode (3) undergoes a reducing treatment.

14. Portable electronic system characterized in that it comprises one or more capacitors (1) according to claim 1.

15. Motor vehicle characterized in that it comprises one or more capacitors (1) according to claim 1.

16. Rail transport system characterized in that it comprises one or more capacitors (1) according to claim 1.

17. Aircraft characterized in that it comprises one or more capacitors (1) according to claim 1.

18. Stationary system characterized in that it comprises one or more capacitors (1) according to claim 1.

19. Electrical circuit comprising at least one capacitor (1) according to claim 1 and a power supply source (6) connected to the terminals of the capacitor in such a way that the first electrode (2) is connected to the positive terminal of the source (6) and the second electrode (3) is connected to the negative terminal.

* * * * *